United States Patent
Selvaraju et al.

(10) Patent No.: US 12,518,053 B2
(45) Date of Patent: Jan. 6, 2026

(54) PROTECTING SENSITIVE PERSONAL INFORMATION IN SPOKEN COMMANDS

(71) Applicant: INTERNATIONAL BUSINESS MACHINES CORPORATION, Armonk, NY (US)

(72) Inventors: Lakshminarayanan Selvaraju, Apex, NC (US); Mohan Gopal Meher, Sonepur (IN); Greg Bruce, Dunwoody, GA (US); Naveen Konathala, Visakhapatnam (IN)

(73) Assignee: International Business Machines Corporation, Armonk, NY (US)

( * ) Notice: Subject to any disclaimer, the term of this patent is extended or adjusted under 35 U.S.C. 154(b) by 247 days.

(21) Appl. No.: 17/662,248

(22) Filed: May 6, 2022

(65) Prior Publication Data
US 2023/0359765 A1 Nov. 9, 2023

(51) Int. Cl.
*G06F 21/62* (2013.01)
*G10L 15/14* (2006.01)
*G10L 15/18* (2013.01)
*G10L 15/22* (2006.01)

(52) U.S. Cl.
CPC .......... *G06F 21/6254* (2013.01); *G10L 15/14* (2013.01); *G10L 15/1822* (2013.01); *G10L 15/22* (2013.01)

(58) Field of Classification Search
CPC ......... G10L 15/08; G10L 15/14; G10L 15/18; G10L 15/1822; G10L 15/22; G10L 15/26; G10L 15/30; G10L 2015/223; G06F 21/6245; G06F 21/6254; H04W 12/02
See application file for complete search history.

(56) References Cited

U.S. PATENT DOCUMENTS

| | | | |
|---|---|---|---|
| 8,244,531 B2 | 8/2012 | Erhart | |
| 9,437,207 B2 | 9/2016 | Jacob et al. | |
| 9,589,149 B2 | 3/2017 | Livshits et al. | |
| 10,531,289 B2 | 1/2020 | Zhu et al. | |
| 11,308,945 B1 * | 4/2022 | Drake | G06F 40/284 |
| 11,803,661 B1 * | 10/2023 | Sutherland | G06F 40/169 |
| 2010/0082342 A1 | 4/2010 | Erhart | |
| 2014/0278366 A1 * | 9/2014 | Jacob | G10L 15/30 |
| | | | 704/235 |

(Continued)

FOREIGN PATENT DOCUMENTS

| | | |
|---|---|---|
| CN | 105791284 B | 7/2016 |
| EP | 21696691 A | 3/2010 |
| WO | 2018208439 A1 | 11/2018 |

OTHER PUBLICATIONS

Disclosed Anonymously, "AI Infused Privacy Controls in a Smart Speaker or Virtual Assistant", IPCOM000262320D, https://priorart.ip.com/IPCOM/000262320, May 19, 2020, pp. 1-5.

(Continued)

*Primary Examiner* — Jeremy S Duffield
(74) *Attorney, Agent, or Firm* — Anthony M. Pallone (57) ABSTRACT

A method, a computer program product, and a system for protecting SPI in spoken commands that include identifying sensitive personal information (SPI) included in unmasked portions of at least one classified command and following a user privacy instruction before transmitting the unmasked portions that include the identified SPI to a third-party service.

15 Claims, 5 Drawing Sheets

(56) References Cited

U.S. PATENT DOCUMENTS

| | | | |
|---|---|---|---|
| 2017/0040002 A1* | 2/2017 | Basson | G09G 5/373 |
| 2017/0091814 A1* | 3/2017 | Liu | G06Q 30/0269 |
| 2019/0005952 A1* | 1/2019 | Kruse | H04M 3/42008 |
| 2020/0005792 A1 | 1/2020 | Wutscher | |
| 2020/0020340 A1* | 1/2020 | Sheikh | G10L 15/063 |
| 2020/0258535 A1* | 8/2020 | Vatanparvar | A61B 5/4803 |
| 2021/0027020 A1* | 1/2021 | Shen | G06F 40/30 |
| 2021/0125615 A1* | 4/2021 | Medalion | G06N 3/044 |
| 2022/0277567 A1* | 9/2022 | Torsner | G06T 11/00 |
| 2023/0096474 A1* | 3/2023 | Krishnan | G06N 3/0464 |
| | | | 726/26 |
| 2023/0169963 A1* | 6/2023 | Sharifi | G06F 3/167 |
| | | | 704/255 |
| 2023/0308381 A1* | 9/2023 | Tahvili | H04L 41/16 |

OTHER PUBLICATIONS

Mell et al., "The NIST Definition of Cloud Computing", National Institute of Standards and Technology, Special Publication 800-145, Sep. 2011, pp. 1-7.

* cited by examiner

PROTECTING SENSITIVE PERSONAL INFORMATION IN SPOKEN COMMANDS

BACKGROUND

Exemplary embodiments of the present inventive concept relate to protecting sensitive personal information, and more particularly, to protecting sensitive personal information in spoken commands.

Speech recognition equipped smart devices can receive and interpret user speech to carry out commands (e.g., queries, requests, etc.). The advent of these smart devices has conferred users thereof with great convenience and multi-tasking capacity. However, the use of speech recognition equipped smart devices can compromise users' sensitive personal information (SPI). SPI types may include, for example tax identification numbers (or another national identification number), health information, personal affairs, home/work addresses, and financial information (e.g., credit card numbers, checking account numbers, etc.). Speech recognition equipped smart devices are often programmed to proactively listen to user speech for buzzwords. Consequently, they may transmit and/or record user speech (including SPI) to their external servers that was unintentionally communicated by the user.

For example, a speech recognition equipped smart device may incidentally transmit and/or record user speech including SPI while passively listening to a user's generic conversation and/or following an accidental keyword activation by the user in an unintended context. Users may also unconsciously overshare SPI to speech recognition equipped smart devices, even when intentionally conveying a spoken command, such as expressing SPI immediately after a command and/or during an excessively detailed command. Moreover, a user's unique voice signature may be transmitted and susceptible to duplication which may be used to perpetuate identity theft if appropriated by the wrong parties. Because transmitted/recorded user speech may be reviewed by employees of speech recognition equipped smart device service providers and/or stored (e.g., for quality assurance purposes), user SPI may be susceptible to eavesdropping, external leak, and improper use.

SUMMARY

Exemplary embodiments of the present inventive concept relate to a method, a computer program product, and a system for protecting SPI in spoken commands.

According to an exemplary embodiment of the present inventive concept, a method is provided for protecting SPI in spoken commands. The method includes identifying sensitive personal information (SPI) included in unmasked portions of at least one classified command and following a user privacy instruction before transmitting the unmasked portions that include the identified SPI to a third-party service.

According to an exemplary embodiment of the present inventive concept, a computer program product is provided for protecting sensitive personal information in spoken commands. The computer program product includes one or more non-transitory computer-readable storage media and program instructions stored on the one or more non-transitory computer-readable storage media capable of performing a method. The method includes identifying sensitive personal information (SPI) in unmasked portions of at least one classified command; and following a user privacy instruction before transmitting the unmasked portions that include the identified SPI to a third-party service.

According to an exemplary embodiment of the present inventive concept, a computer system is used to protect sensitive personal information in spoken commands. The system includes one or more computer processors, one or more computer-readable storage media, and program instructions stored on the one or more of the computer-readable storage media for execution by at least one of the one or more processors capable of performing a method. The method includes identifying sensitive personal information (SPI) included in unmasked portions of at least one classified command and following a user privacy instruction before transmitting the unmasked portions that include the identified SPI to a third-party service.

BRIEF DESCRIPTION OF THE DRAWINGS

The following detailed description, given by way of example and not intended to limit the exemplary embodiments solely thereto, will best be appreciated in conjunction with the accompanying drawings, in which.

It is to be understood that the included drawings are not necessarily drawn to scale/proportion. The included drawings are merely schematic examples to assist in understanding of the present inventive concept and are not intended to portray fixed parameters. In the drawings, like numbering may represent like elements.

DETAILED DESCRIPTION OF THE DRAWINGS

Exemplary embodiments of the present inventive concept are disclosed hereafter. However, it shall be understood that the scope of the present inventive concept is dictated by the claims. The disclosed exemplary embodiments are merely illustrative of the claimed system, method, and computer program product. The present inventive concept may be embodied in many different forms and should not be construed as limited to only the exemplary embodiments set forth herein. Rather, these included exemplary embodiments are provided for completeness of disclosure and to facilitate an understanding to those skilled in the art. In the detailed description, discussion of well-known features and techniques may be omitted to avoid unnecessarily obscuring the presented exemplary embodiments.

References in the specification to "one embodiment," "an embodiment," "an exemplary embodiment," etc., indicate that the embodiment described may include a particular feature, structure, or characteristic, but not every embodiment may necessarily include that feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether explicitly described.

In the interest of not obscuring the presentation of the exemplary embodiments of the present inventive concept, in the following detailed description, some processing steps or operations that are known in the art may have been combined for presentation and for illustration purposes, and in some instances, may have not been described in detail. Additionally, some processing steps or operations that are known in the art may not be described at all. The following detailed description is focused on the distinctive features or elements of the present inventive concept according to various exemplary embodiments.

As aforementioned, the inclusion of SPI in transcribed user speech and user speech transmitted to third-parties (e.g., message recipients, speech recognition service providers, etc.) can create serious and often overlooked privacy risks to users. A means is needed to safeguard against the inadvertent transmission of user SPI to third-parties and thus prevent costly leaks, embarrassment, and identity fraud. The present inventive concept provided herein provides a method built over an artificial intelligence (AI) model to determine and mitigate the inadvertent divulgence of SPI in user speech and corresponding user speech transcription. The SPI components of user speech will be tagged for each token of a user speech corpus. Each tokenized word/phrase will be classified as to whether it is SPI content or not. If an SPI word/phrase is found, the present inventive concept will ask the user to confirm permission for transmission and/or apply predetermined rules therefore. Once the SPI tokens are confirmed by the user or by reference to the predetermined rules, the present inventive concept will generate a modified command for transmission to a third-parties. Thus, the modified command may avoid inadvertent disclosure of user SPI, and therefore improve upon both devices used within and the technical fields of voice commands and data privacy.

Figure 1:
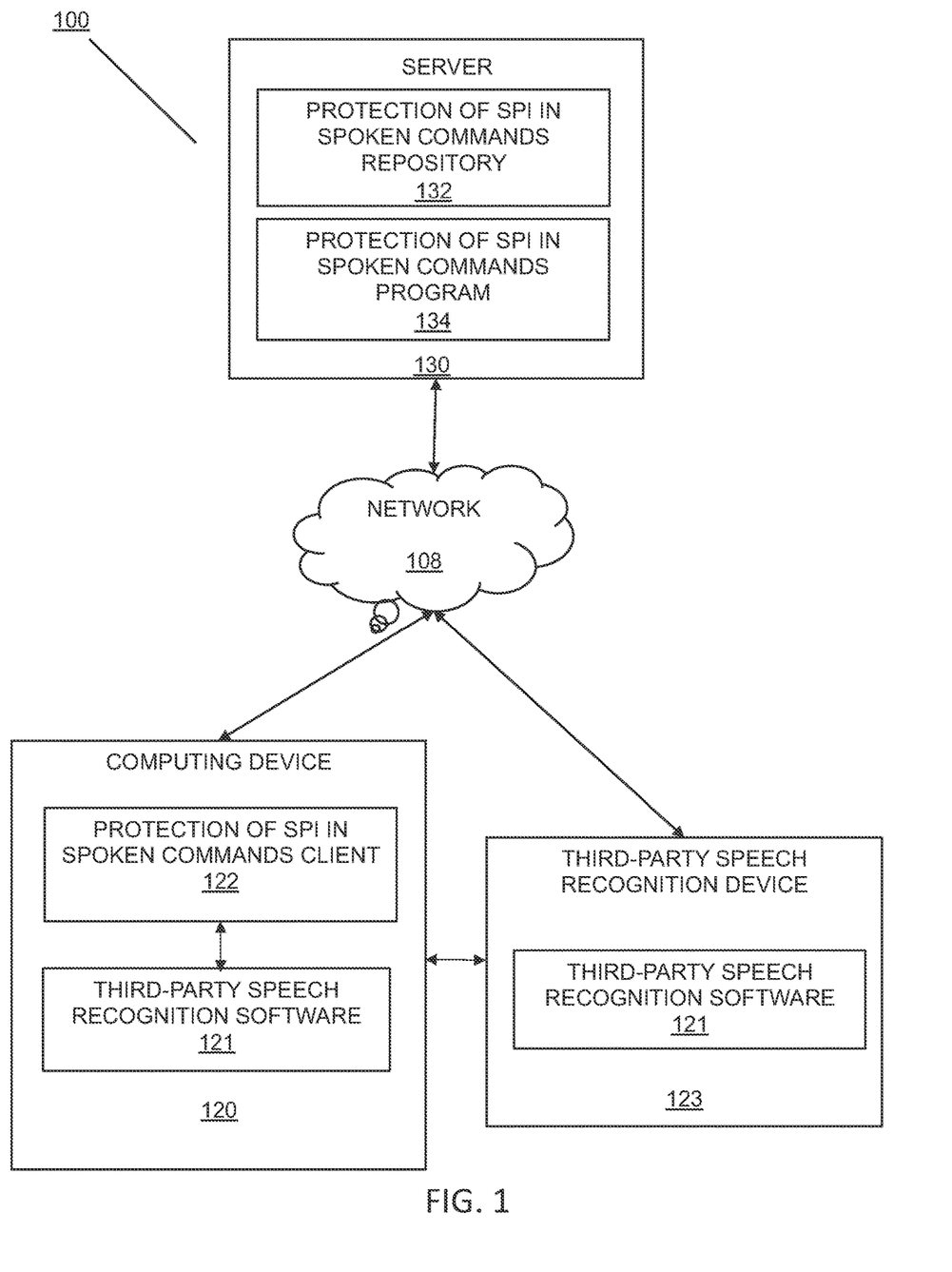
FIG. 1 illustrates a schematic diagram of a protecting SPI in spoken commands system 100, in accordance with an exemplary embodiment of the present inventive concept.

FIG. 1 depicts a protecting SPI in spoken commands system 100, in accordance with an exemplary embodiment of the present inventive concept.

The protecting SPI in spoken commands system 100 may include a user operated computing device 120 and a protecting SPI in spoken commands server 130, which may all be interconnected via a network 108. Programming and data content may be stored and accessed remotely across several servers via the network 108. Alternatively, programming and data may be stored locally on as few as one physical computing device 120 or stored amongst multiple computing devices. The protecting SPI in spoken commands system 100 may communicate with a third-party speech recognition device 123 via the network 108.

According to the exemplary embodiment of the present inventive concept depicted in FIG. 1, the network 108 may be a communication channel capable of transferring data between connected devices. The network 108 may be the Internet, representing a worldwide collection of networks 108 and gateways to support communications between devices connected to the Internet. Moreover, the network 108 may utilize various types of connections such as wired, wireless, fiber optic, etc., which may be implemented as an intranet network, a local area network (LAN), a wide area network (WAN), or a combination thereof. The network 108 may be a Bluetooth network, a Wi-Fi network, or a combination thereof. The network 108 may operate in frequencies including 2.4 GHz and 5 GHz internet, near-field communication, Z-Wave, Zigbee, etc. The network 108 may be a telecommunications network used to facilitate telephone calls between two or more parties comprising a landline network, a wireless network, a closed network, a satellite network, or a combination thereof. In general, the network 108 may represent any combination of connections and protocols that will support communications between connected devices. The third-party speech recognition device 123 may be further connected to a third-party speech recognition server.

The computing device 120 and/or the third-party device 123 may include speech recognition software 121, a protecting SPI in spoken commands client 122, and may be an enterprise server, a laptop computer, a notebook, a tablet computer, a netbook computer, a personal computer (PC), a desktop computer, a server, a personal digital assistant (PDA), a smart phone, a mobile phone, a virtual device, a thin client, an IoT device, or any other electronic device or computing system capable of sending and receiving data to and from other computing devices. The computing device 120 may be equipped with a microphone, a camera, and/or movement sensors. The computing device 120 may be a speech recognition equipped smart device. Although the computing device 120 is shown as a single device, the computing device 120 may be comprised of a cluster or plurality of computing devices, in a modular manner, etc., working together or working independently.

Figure 3:
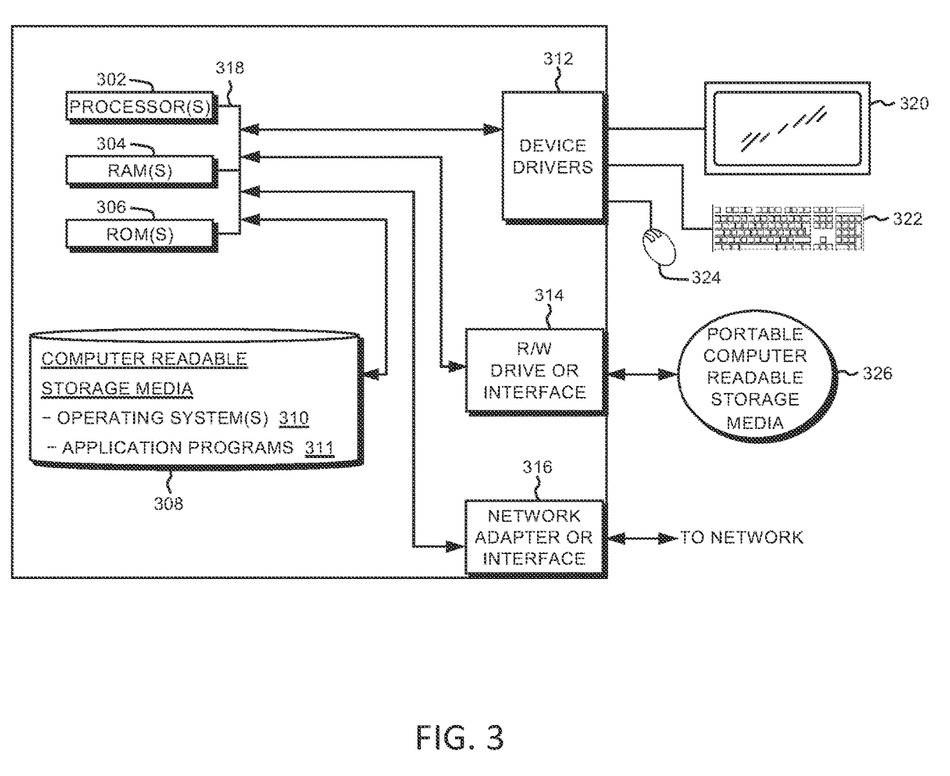
FIG. 3 illustrates a block diagram depicting the hardware components included in the protecting SPI in spoken commands system 100 of FIG. 1, in accordance with an exemplary embodiment of the present inventive concept.
Figure 4:
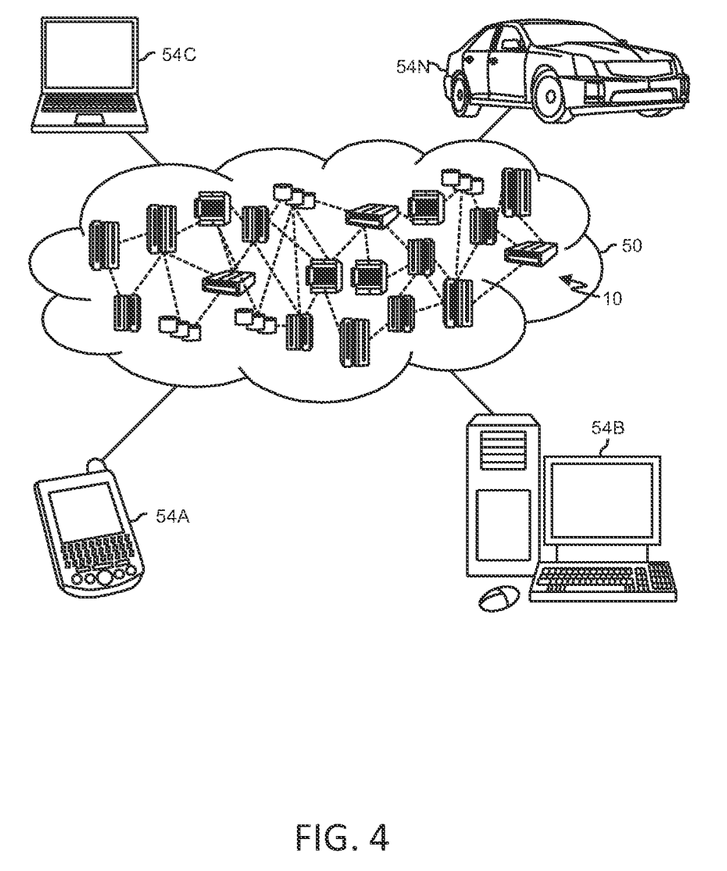
FIG. 4 illustrates a cloud computing environment, in accordance with an exemplary embodiment of the present inventive concept.
Figure 5:
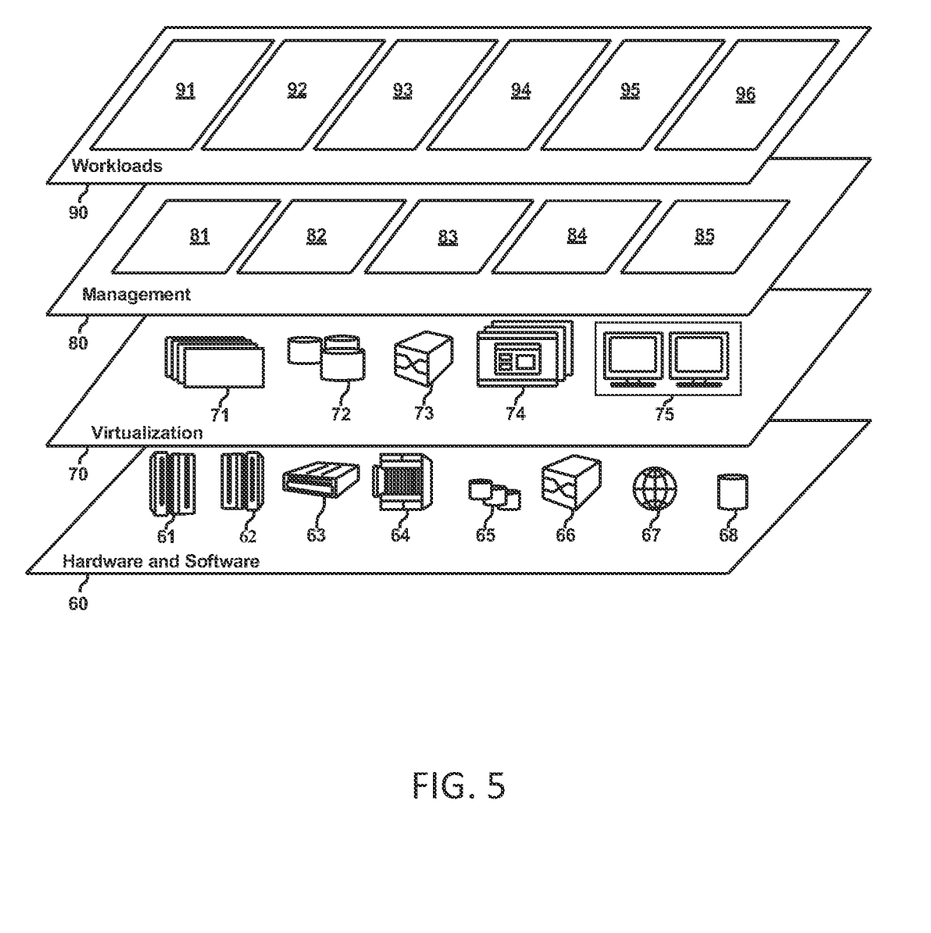
FIG. 5 illustrates abstraction model layers, in accordance with an exemplary embodiment of the present inventive concept.

The computing device 120 is described in greater detail as a hardware implementation with reference to FIG. 3, as part of a cloud implementation with reference to FIG. 4, and/or as utilizing functional abstraction layers for processing with reference to FIG. 5.

The protecting SPI in spoken commands client 122 may act as a client in a client-server relationship with a server, for example the protecting SPI in spoken commands server 130. The protecting SPI in spoken commands client 122 may be a software and/or a hardware application capable of communicating with and providing a user interface for a user to interact with the protecting SPI in spoken commands server 130 and/or other computing devices via the network 108. Moreover, the protecting SPI in spoken commands client 122 may be capable of transferring data between the computing device 120 and other computer devices/servers via the network 108. The protecting SPI in spoken commands client 122 may utilize various wired and wireless connection protocols for data transmission and exchange, including Bluetooth, 2.4 GHz and 5 GHz internet, near-field communication, etc. The protecting SPI in spoken commands client 122 is described in greater detail with respect to FIGS. 2-5.

The protecting SPI in spoken commands server 130 may include a protecting SPI in spoken commands repository 132 for storing various data (e.g., user credentials, user speech audio, user speech corpora, modified command models, modified commands, user predetermined SPI rules/permissions, SPI keyword database, SPI keyword models, SPI keyword knowledge graphs, etc.) and the protecting SPI in spoken commands program 134. The protecting SPI in spoken commands program 134 may generate a user speech corpus and classify commands; mask superfluous portions of the classified commands; and identify SPI in unmasked portions of the classified commands and transmit a modified command. The protecting SPI in spoken commands server 130 may act as a server in a client-server relationship with a client, e.g., the protecting SPI in spoken commands client 122. The protecting SPI in spoken commands server 130 may be an enterprise server, a laptop computer, a notebook, a tablet computer, a netbook computer, a personal computer (PC), a desktop computer, a server, a personal digital assistant (PDA), a rotary phone, a touchtone phone, a smart phone, a mobile phone, a virtual device, a thin client, an IoT device, or any other electronic device or computing system capable of sending and receiving data to and from other computing devices. Although the protecting SPI in spoken commands server 130 is shown as a single computing device, the present inventive concept is not limited thereto. For example, the protecting SPI in spoken commands server 130 may be comprised of a cluster or plurality of computing devices, in a modular manner, etc., working together or working independently.

The protecting SPI in spoken commands server 130 is described in greater detail as a hardware implementation with reference to FIG. 3, as part of a cloud implementation with reference to FIG. 4, and/or as utilizing functional abstraction layers for processing with reference to FIG. 5. The protecting SPI in spoken commands program 134 and/or the protecting SPI in spoken commands client 122 may be software and/or hardware programs that may facilitate protecting SPI in spoken commands discussed in further detail with reference to FIGS. 2-5.

Figure 2:
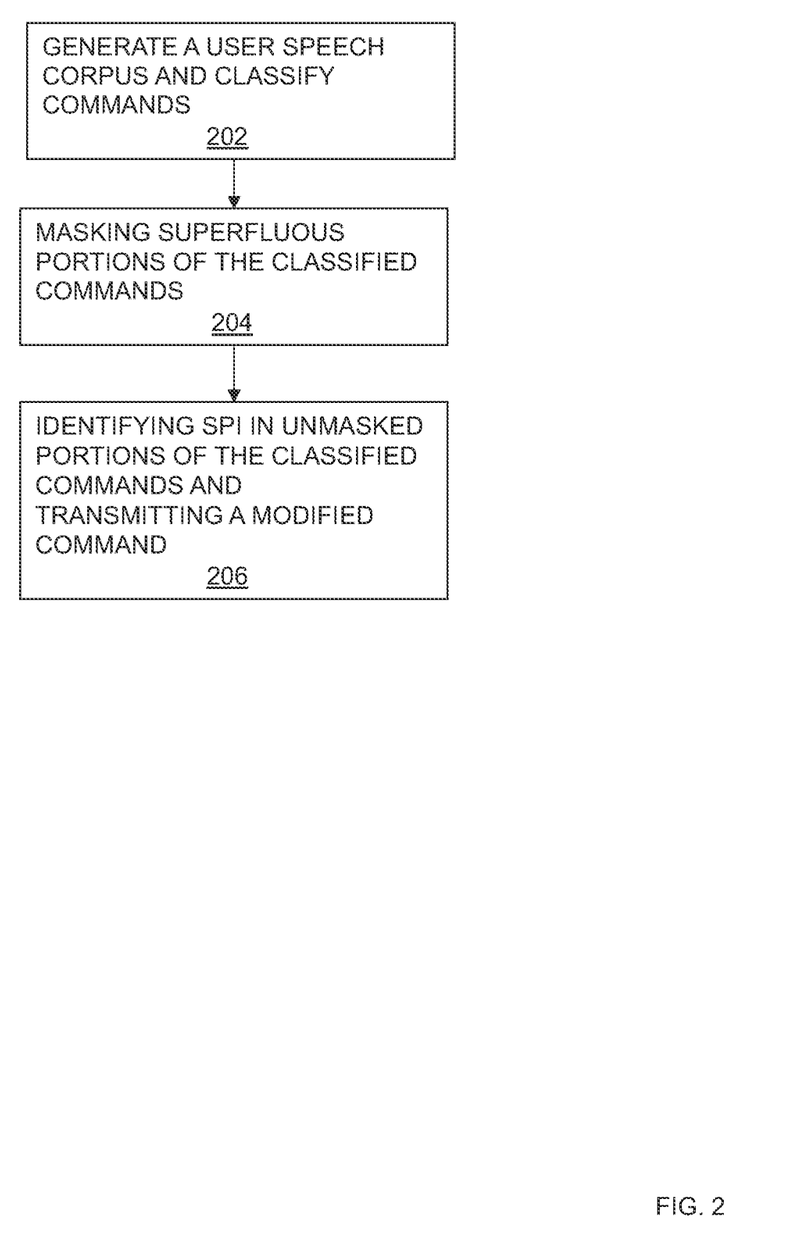
FIG. 2 illustrates a flowchart of protecting SPI in spoken commands 200, in accordance with an exemplary embodiment of the present inventive concept.

FIG. 2 illustrates the flowchart of protecting SPI in spoken commands 200, in accordance with an exemplary embodiment of the present inventive concept.

The protecting SPI in spoken commands program 134 may generate a user speech corpus and classify commands in the user speech corpus (step 202). A user may register/login to the protecting SPI in spoken commands program 134 via the protecting SPI in spoken commands client 122 using a set of unique credentials (e.g., username/password and/or biometric credentials) to access user speech audio, user speech corpora, modified commands, user predetermined SPI rules/permissions, SPI keyword database, SPI keyword models, SPI keyword knowledge graphs, etc., stored within the protecting SPI in spoken commands repository 132. In an embodiment, after user authentication, the protecting SPI in spoken commands program 134 may be configured to initialize and run simultaneously with the operation of the third-party speech recognition device 123 and/or the speech recognition software 121. The protecting SPI in spoken commands program 134 may also be initialized in advance of the third-party speech recognition software 121 (e.g., upon a user action, such as a voice activated command, and/or detection of an initializing keyword spoken by the user, etc.). The initializing keyword(s) may be a predetermined phrase, topic, or specific word (e.g., selected by the user), or may be an initializing keyword that is common to a third-party speech recognition software 121 installed on the computing device 120 (e.g., Siri® (Siri is a registered Trademark of Apple, Inc.), Alexa, etc.). In a scenario in which the protecting SPI in spoken commands client 122 is installed on a speech recognition device 123 and/or a computing device 120 including the third-party speech recognition software 123, the protecting SPI in spoken commands client 122 may be configured to disable/preempt the third-party speech recognition software 123 before user speech is obtained thereby. In an embodiment, the protecting SPI in spoken command program 134 may be connected to a camera or the like for detecting user activating body language, such as a user pointing or otherwise gesturing to a third-party speech recognition device 123 and/or the computing device 120, and may be initialized accordingly. The generated user speech corpus may be transcribed from audio multimedia of the user speech by the protecting SPI in spoken commands program 134 via machine learning (ML) processes (e.g., by voice-to-text software). Once initialized, the protecting SPI in spoken commands program 134 may act as an intermediary between the user and the third-party speech recognition software 123 and preempt user speech transmission. User commands may be classified in the user speech corpus using NLP. Generic conversation (e.g., devoid of initializing keywords) may similarly be classified and filtered out.

For example:

TABLE 1

| Input Text | 1st Level Filtered Text |
| --- | --- |
| It may rain today in our city. | NULL |
| Alexa, what is the time now? | Alexa, what is the time now. |
| Siri is the name of my second cousin. | Siri is the name of my second cousin. |
| I think I should go for a vacation beginning tomorrow. | NULL |

In the first level of filtration, the protecting SPI in spoken commands program 134 listens for initializing keywords (e.g., Alexa, Siri, device_name, etc.). If it does not detect any initializing keywords, then it will not process the user speech into the user text corpus. As depicted in the above table, the 1st and 4th text segment lines labelled "NULL" will be filtered out in the first level of filtration.

As a second level of filtration of user data, the protecting SPI in spoken commands program 134 will classify the user speech corpus by labelling at least a portion thereof as "Generic Conversation" or "Command". A command may be a request for assistance, e.g., answer a question or activate another device, and only text that is classified as a command will undergo further processing in subsequent steps. Thus, unintended/generic conversation, i.e., non-commands, that can potentially contain SPI may be excised from the user speech and/or user speech corpus in the second level of filtration. For example, the spoken phrases "my daughter plays with Alex" and "Siri is the name of my second cousin" may be classified as generic conversation and filtered out accordingly, whereas the user utterance "Alexa, please get me the IBM Help Desk contact number" is classified as a command and thus preserved for further processing in subsequent steps.

The protecting SPI in spoken commands program 134 may mask superfluous portions of the classified commands (step 204). As illustrated in Table 1 included above, some keyword activations may be false positives. Thus, at least a portion of some user speech that is superfluous to the command may persist. Masking superfluous portions of the classified commands may include a step for tokenization (e.g., via Python NLTK library) and cleaning stop words/phrases. Tokenization may include treating the user speech corpus as a string and then partitioning the string into a list of tokens. Removing stop words/phrases may include removal of low informational value words such as "the", "a", "and", etc., which exist primarily for grammatical syntax while imparting little meaning. These are typically the most common words/phrases in any language (like articles, prepositions, pronouns, conjunctions, etc.) and do not add much information to the text. Tokenized words/phrases may be assigned an intent classification to determine whether tokenized words/phrases are integral to the command. In an embodiment, a stemming algorithm may be applied that converts different word forms into similar canonical form. This step is the process of conflating tokens to their root form (e.g., "connection" to "connect", "computing" to "compute", etc.).

For example, with "0" indicating essential:

TABLE 2

| Input Text | Input Tokens | Intent Classification | Unmasked Text |
|---|---|---|---|
| Hi Siri, what is the customer care number for the Pharmacy so that I can schedule an appointment for my flu-shot? | customer | 0 | Hi Siri, what is the customer care number for the Pharmacy? |
| | care | 0 | |
| | number | 0 | |
| | pharmacy | 0 | |
| | that | 1 | |
| | schedule | 1 | |
| | appointment | 1 | |
| | flu-shot | 1 | |

It is shown in Table 2 above that the last 4 tokenized words (which don't impact the desired command meaning) have been classified by the NLP as non-essential ("1"). Accordingly, the tokenized words with intent classifications demarcated "1" will be masked before the user speech and/or user speech corpus is transmitted as an input to the voice gadgets and hence this protects the users by not providing some personal information nonessential to conveying the command.

The protecting SPI in spoken commands program 134 may identify SPI in unmasked portions of the classified command and may transmit a modified command (step 206).

The topics of SPI and or specific words/phrases of SPI may have predetermined SPI rules/permissions for allowance or denial. The user may also restrict the SPI according to third-party characteristics, such as identity of recipient device (e.g., name of third-party speech recognition device), entity (specifically named parties), type/category (e.g., individual, medical provider, family, friend, business, etc.), etc. In an embodiment of the present inventive concept, the protecting SPI in spoken commands program 134 may perform SPI detection and present the user with an option to include, exclude, or substitue the word/phrase from the modified command. The user may be requested to create an ongoing rule/permission based on their selection for the inclusion/exclusion/substitution of the predetermined word/phrase or apply the selection only in that specific instance. The user may grant such permission via voice command or manual confirmation. Once the SPI detected word permissions have been finalized, the modified command may be transmitted to the third-party as a modified user speech recording (audio) and/or a modified user speech corpus. The transmitted modified command may be a modified user speech corpus and/or a modified user speech. In an embodiment of the present inventive concept in which the third-party speech recognition device 123 and/or the third-party speech recognition software 121 is disabled/off or not within hearing distance of the user, the protecting SPI in spoken commands program 134 may transmit an artificially generated audio version of the modified command using text-to-speech software. The generated audio may include a different voice than the user. In an embodiment, the protecting SPI in spoken commands program 134 may learn the permissions for SPI keyword words/phrases.

For example:

TABLE 3

| Input Text | Input Tokens | SPI Detection | User Action | Output Text |
|---|---|---|---|---|
| Hi Siri, Please reply to Dr.xyz as I confirm my blood group is O+ | Please | No | User Confirmed | Hi Siri, Please reply to Dr. xyz as I confirm my blood group is O+ |
| | Reply | No | | |
| | Dr.XYZ | No | | |
| | as | No | | |
| | I | No | | |
| | Confirmed | No | | |
| | my | No | | |
| | blood | Vo | | |
| | group | Vo | | |
| | as | No | | |
| | O+ | Yes | | |
| Hi Siri, reply Mohan as "Please enter pin 1234 while entering the gate-1, north-street, Vizah" | reply | No | | Hi Siri, reply Mohan as "Please enter pin 1234 while entering my Home. |
| | Mohan | No | | |
| | as | No | | |
| | Please | No | | |
| | Enter | No | | |
| | Pin | Yes | User Confirmed | |
| | 1234 | Yes | User Confirmed | |
| | While | Vo | | |
| | Entering | No | | |
| | Gate-1 | Yes | Annonymized | |
| | North-street | Yes | Annonymized | |
| | Vizah | Yes | Annonymized | |

Tokenized words/phrases from the unmasked portions of the classified commands may be input to the NLP to detect predetermined keywords associated with SPI topics, such as individualized health data, financial information, banking information, social security information, tax identification information, interpersonal information, etc. These topics of SPI may be preselected by the user for automatic filtration, or the protecting SPI in spoken commands program 134 may be pre-programmed with default filters by the manufacturer.

In an embodiment utilizing the preselected rules/permissions, when the protecting SPI in spoken commands program 134 detects SPI keywords which can compromise privacy, it will automatically anonymize the text. In the above example, the user wants to send a message to his close friend with the help of Gadgets where he provided his address and the passphrase to open his gate. The system will recognize this and replace the address with "Home" and, after user confirmation, send the message to his friend as his friend already knows the address of the user and does not need the home address though the message. In this way, the user's SPI will not be sent to the speech recognition software 123, hence providing a safety guard to the user. If anonymization is mistaken, the recipient may reply to the protecting SPI in spoken commands program 134 and ask the user to override the anonymization.

Overall, the protecting SPI in spoken commands program 134 according to the present inventive concept may operate as the virtual microphone for assistants like Siri, Alexa, Cortana, Bixby, and Google Assistant. Thus, the third-parties no longer listen to the raw user speech or read the original user speech corpus, but instead receive a modified command. The user also has an option to review, re-record, re-write, and otherwise edit the modified command before the information is sent to the third-parties to ensure that the user's SPI is secure and that all the access to the logs are protected and fully controlled by the user alone. The user's edits may be learned by the protecting SPI in spoken commands program 134 in order to tune model(s) used in protecting SPI in spoken commands. In an embodiment, the protecting SPI in spoken commands 200 may be performed locally on a user's computing device 120 using the protecting SPI in spoken commands client 122 rather than by the protecting SPI in spoken commands program 134. The user's data stored in the protecting SPI in spoken commands repository 132 may be encrypted. Encryption may also be performed prior to transmission of the user's data to a third-party speech recognition software 121 and/or over the network 108.

In an embodiment, a protecting SPI in spoken commands model may be generated which may further include sub-models for automating decision-making throughout steps 202-206. Although the below steps are discussed with reference to textual multimedia, models may also be developed for audio multimedia.

The models for implementing the steps of the protecting SPI in spoken commands 200 may be performed by the protecting SPI in spoken command program 134 using NLP/AI though they have different inputs and outputs.

To implement the protecting SPI in spoken commands 200, AI and NLP may be used. Since computing devices understand numbers rather than raw text, NLP is used to help computers understand, interpret, and manipulate human language. NLP draws from many disciplines, including computer science and computational linguistics, in its pursuit to fill the gap between human communication and computer understanding.

The AI/NLP component of this system may start with the data extraction from the Voice-To-Text API which converts the user voice data (user speech) to text data (user speech corpus). Since this input data may be free format text data, we may process the same through NLP to facilitate AI understanding and learning from it.

According to the present embodiment of the inventive concept, we may best classify the text into different classes based on the input data by predicting with the AI system. With the help of text classification technique in AI/NLP, the text will be classified. Here are the details of how the AI/NLP may work:

Text classification: Text classification is a ML technique that assigns a set of predefined categories to open-ended text. Text classifiers can be used to organize, structure, and categorize pretty much any kind of text—from documents, medical studies, and files all over the web.

Using text classifiers, companies can automatically structure all manner of relevant text, from emails, legal documents, social media, chatbots, surveys, and more in a fast and cost-effective way. This allows companies to save time analysing text data, automate business processes, and make data-driven business decisions.

The different phases for implementing text classification may include data collection, pre-processing, feature extraction, feature selection, building a ML model, and ML model performance evaluation.

Pre-processing: The first step of pre-processing is to convert the text documents into a clear word format. The documents prepared for next step in text classification are represented by a large number of features. Commonly the steps taken are:
 a. Tokenization: A dsocument is treated as a string, and then partitioned into a list of tokens.
 b. Removing stop words: Stop words such as "the", "a", "and", etc. are frequently occurring, so the insignificant words may be removed.
 c. Stemming word: Stemming words refers to applying the stemming algorithm that converts different word forms into a similar canonical form. This step is the process of conflating tokens to their root form.
 d. POS Tagging: Parts of Speech Tagging is a process to label the words in text format for a particular part of a speech based on their definitions and context. POS tagging is responsible for text reading in a language and assigning some specific token (POS) to each word. It is also called grammatical tagging.

Feature Extraction: The documents' representation is one of the pre-processing techniques that is used to reduce the complexity of the documents and make them easier to handle, the documents each have to be transformed from the full text version to a document vector. The most commonly used document representation is called vector space model (VSDM), documents are represented by vectors of words.

Feature Selection: After pre-processing and feature extraction, feature selection is used to construct vector space, which improves the scalability, efficiency and accuracy of a text classifier. The main idea of Feature Selection is to select subsets of features from the original documents.

Classification: We can perform text classification in two ways: manual or automatic.
 a. Manual text classification: This involves a human annotator, who interprets the content of text and categorizes it accordingly. This method can deliver good results but it's time-consuming and expensive.
 b. Automatic text classification: This applies ML, NLP, and other AI-guided techniques to automatically classify text in a faster, more cost-effective, and more accurate manner.

In our disclosure we are proposing to focus on automatic text classification. However, the present inventive concept is not limited thereto.
 c. There are many approaches to automatic text classification, but they all fall under three types of systems:
  i. Rule-based systems: This method classifies text into organized groups by using a set of handcrafted linguistic rules. These rules instruct the system to use semantically relevant elements of a text to identify relevant categories based on content. Each rule includes an antecedent or pattern and a predicted category. This method requires deep knowledge of the domain and it is also time-consuming.
  ii. Machine learning-based systems: They learn to make classifications based on past observations. By using pre-labelled examples as training data, machine learning algorithms can learn the different associations between pieces of text, and that a particular output (e.g., tags) are expected for a particular input (e.g., text). A "tag" is the pre-determined classification or category that any given text could fall into.

iii. Hybrid systems: These combine a ML-trained base classifier with a rule-based system to further improve the results. These hybrid systems can be easily fine-tuned by adding specific rules for those conflicting tags that haven't been correctly modelled by the base classifier.

A ML based system would suffice to solve this current problem of text classification. However, the present inventive concept is not limited thereto. The hybrid system can also be built to attain greater accuracy depending on the evaluation of the ML based method.

$$F-measure = \frac{2*precision*recall}{precision+recall}$$

d. Accuracy measures the overall degree to which instances have been correctly classified, using the formula as defined below.

$$Accuracy = \frac{No. \text{ of correctly classified instances}}{Total \text{ no. of instances}}$$

AI-Machine learning: For this task the solution provider must take help of a large vocabulary of text to make a pre-trained model. To train a model, we need to break the sentences into vectors which are the numerical representation of the sentences.

TABLE 4

| | Text | Tag | Tokenize | Tokenize_Cleaned |
|---|---|---|---|---|
| 0 | My Daughter plays with Alexa | General Conversation | (My, Daughter, plays, with, Alexa] | [My, Daughter, plays, Alexa] |
| 1 | Siri is the name of my second cousin | General Conversation | (Siri, is, the, name, of my, second, cousin] | (Siri, name, second, cousin] |
| 2 | Alexa, please get me IBM help desk contact number | Command | (Alexa, please, get, me, IBM, help, desk, c . . . | [Alexa, please, get, IBM, help desk, conta . . . |

Performance Evaluation: The performance of Text Classification System can be evaluated by using four metrics: Accuracy, Precision, Recall and F-measure.

a. Precision: Precision measures the exactness of a classifier. A higher precision value means less false positives, while a lower precision value means more false positives.

$$Precision = \frac{No. \text{ of correct extracted text}}{Total \text{ no. of extracted texts}}$$

b. Recall: Recall measures the completeness, or sensitivity, of a classifier. Higher recall means less false negatives, while lower recall means more false negatives.

$$Recall = \frac{No. \text{ of corrected extracted texts}}{Total \text{ number of annotated texts}}$$

c. F-measure: Precision and recall can be combined to produce a single metric known as F-measure, which is the weighted harmonic mean of precision and recall. The main advantage of using F-measure is it is able to rate a system comprehensively with one unique rating.

The text data will be cleaned through Data-Pre-Processing phase (mentioned earlier) and the vector of the text along with their pre-defined tag (label) will be sent further to the next step.

The text is broken into word tokens via Python NLTK library and gets cleaned e.g., removing the stop words like 'is', 'me', 'of' so that these cleaned tokens can be converted into word vectors. There may be some other words which can be removed depending on the context and business needs.

Word Embedding: The next step towards training a machine learning NLP classifier is feature extraction: a method is used to transform each word/phrase into a numerical representation in the form of a vector. The cleaned data needs to be converted into a numerical format where each word/phrase is represented by a matrix (word vectors). This is also known as word embedding.

One of the most frequently used approaches is bag of words, where a vector represents the frequency of a word in a predefined dictionary of words. One of other the popular methods for this task is TF-IDF.

However, the present inventive concept is not limited thereto. For example, a few other advanced methodologies can also be tried, like Word2Vec and BERT classifier.

Using the bag of words technique, here is the vector representation of the text. The vector will be taken as input features for the ML model Classifier.

| Document | My | Daughter | Plays | Alexa | Siri | Name | Second | Cousin | in | Please | IBM | Get | Help | Desk | Contact | Number |
|---|---|---|---|---|---|---|---|---|---|---|---|---|---|---|---|---|
| My Daughter plays with Alexa | 1 | 1 | 1 | 1 | 0 | 0 | 0 | 0 | 0 | 0 | 0 | 0 | 0 | 0 | 0 | 0 |
| Siri is the name of my second cousin | 0 | 0 | 0 | 0 | 1 | 1 | 1 | 1 | 0 | 0 | 0 | 0 | 0 | 0 | 0 | 0 |

| Document | My | Daughter | Plays | Alexa | Siri | Name | Second | Cousin | Please | IBM | Get | Help | Desk | Contact | Number |
|---|---|---|---|---|---|---|---|---|---|---|---|---|---|---|---|
| Alexa, please get me IBM help deskc ontact number | 0 | 0 | 0 | 0 | 0 | 0 | 0 | 0 | 1 | 1 | 1 | 1 | 1 | 1 | 1 |

Table 5 above shows the application of an n-gram model (unigram, n=1) where a single word is taken into consideration for vector creation. The method of Bigram (n=2), trigram (n=3) also be used. For example, in case of for bigram the vector of words will be extracted from two adject words (shown below) and their frequency in the same way it was done for unigram.

```
Bi-gram word vectors:
{
('my', 'daughter') ('daughter' 'plays') ('plays' , 'with') ('with' 'alexa')
('siri', 'is') ('is' 'the') (the', name') ('name' 'of') ('of' 'my')
('my' 'second') ('second' 'cousin')
}
```

An alternative and popular approach, TF*IDF, is an information retrieval technique that weighs a term's frequency (TF) and its inverse document frequency (IDF). Each word or term that occurs in the text has its respective TF and IDF score. The product of the TF and IDF scores of a term is called the TF*IDF weight of that term. Put simply, the higher the TF*IDF score (weight), the rarer the term is in a given document and vice versa.

```
TFIDF score for term i in document j = TF(i,j) = IDF(i)
where
IDF = Inverse Document Frequency
TF = Term Frequency
TF(i,j) = Term i frequency in document j / Total words in document j
And
t = Term
```

The above techniques will produce the metrices for the given text which will further be used in the machine learning. These tasks can be easily done using Python Library.

Model Training and Testing Phase: With the given input (vector features) and output (Tag/labelled), the training process can commence. The next challenge is to select a classifier or ML algorithm which can give desired accuracy for prediction.

The input data set will be split into two categories, Training and Validation or Testing. The model has to get trained on the training dataset to learn from the data. The ML classifier has to be tested on the Testing data set to measure the performance of the model. With the help of input features of the testing data, the Classifier will predict the target and that target will be verified against the given target.

ML Algorithm: The ML algorithm for classifying the tags can be one which could provide maximum accuracy for classifying the new texts. A few very common ML algorithms to perform this task are Naïve Bayes, Support Vectory Machine (SVM) and deep learning.

Deep learning is a set of algorithms and techniques inspired by how the human brain works, called neural networks. Deep learning architectures offer huge benefits for text classification because they perform at super high accuracy with lower-level engineering and computation.

The two main deep learning architectures for text classification are Convolutional Neural Networks (CNN) and Recurrent Neural Networks (RNN).

Deep learning is hierarchical machine learning, using multiple algorithms in a progressive chain of events. It's similar to how the human brain works when making decisions, using different techniques simultaneously to process huge amounts of data. Turning to this task, we suggest the RNN deep learning method, however, the present inventive concept is not limited thereto. As it compares with a CNN model, an RNN model can be similarly effective or even better at specific natural language tasks.

RNNs: RNNs are specialized neural-based approaches that are effective at processing sequential information. An RNN recursively applies a computation to every instance of an input sequence conditioned on the previous computed results. These sequences are typically represented by a fixed-size vector of tokens which are fed sequentially (one by one) to a recurrent unit.

The main strength of an RNN is its capacity to memorize the results of previous computations and use those results in the current computation. This makes RNN models suitable to model context dependencies in inputs of arbitrary length so as to create a proper composition of the input. RNNs have been used to study various NLP tasks such as machine translation, image captioning, and language modeling, among others.

Different variants of RNNs, such as modern techniques like long short-term memory (LSTM) networks, residual networks (ResNets), and gated-recurrent networks (GRU) can be taken into consideration based on the obtaining results in validation dataset.

The above mentioned AI component will be created by the solution provider and the ML file, like a pickle file, will be provided to the user. The AI/ML methods described above may generate models for steps 202-206 above. In step 202, a model may be generated for classifying commands in the user speech corpus. The model may, e.g., look for patterns in commands such as "find me X" or "do Y". In step 204, a model may be generated for masking superfluous portions of the classified commands. The model may, e.g., look for stop words and low informational value words, words flagged by the user, and/or by ML from their inclusion/exclusion in similar commands. In step 206, a model may be generated for identifying SPI in unmasked portions of the classified commands as well as transmitting the modified command. The models may use ML to identify reoccurring SPI words and permissions/rules respectively. The user can get this file and install it into their system/device which does not need any internet connection. Since this can run without connecting with internet, the user data will not be sent to the cloud or a third-party (e.g., speech recognition service provider). The user can delete their local voice history manually or via command. This makes the present inventive concept functional independent of the use of cloud storage.

FIG. 3 illustrates a block diagram depicting the hardware components of the optimization of alternate trip scheduling system 100 of FIG. 1, in accordance with an exemplary embodiment of the present inventive concept.

It should be appreciated that FIG. 3 provides only an illustration of one implementation and does not imply any limitations regarding the environments in which different embodiments may be implemented. Many modifications to the depicted environment may be made.

Devices used herein may include one or more processors 302, one or more computer-readable RAMs 304, one or more computer-readable ROMs 306, one or more computer readable storage media 308, device drivers 312, read/write drive or interface 314, network adapter or interface 316, all interconnected over a communications fabric 318. Communications fabric 318 may be implemented with any architecture designed for passing data and/or control information between processors (such as microprocessors, communications and network processors, etc.), system memory, peripheral devices, and any other hardware components within a system.

One or more operating systems 310, and one or more application programs 311 are stored on one or more of the computer readable storage media 308 for execution by one or more of the processors 302 via one or more of the respective RAMs 304 (which typically include cache memory). In the illustrated embodiment, each of the computer readable storage media 308 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Devices used herein may also include a R/W drive or interface 314 to read from and write to one or more portable computer readable storage media 326. Application programs 311 on said devices may be stored on one or more of the portable computer readable storage media 326, read via the respective R/W drive or interface 314 and loaded into the respective computer readable storage media 308.

Devices used herein may also include a network adapter or interface 316, such as a TCP/IP adapter card or wireless communication adapter (such as a 4G wireless communication adapter using OFDMA technology). Application programs 311 on said computing devices may be downloaded to the computing device from an external computer or external storage device via a network (for example, the Internet, a local area network or other wide area network or wireless network) and network adapter or interface 316. From the network adapter or interface 316, the programs may be loaded onto computer readable storage media 308. The network may comprise copper wires, optical fibers, wireless transmission, routers, firewalls, switches, gateway computers and/or edge servers.

Devices used herein may also include a display screen 320, a keyboard or keypad 322, and a computer mouse or touchpad 324. Device drivers 312 interface to display screen 320 for imaging, to keyboard or keypad 322, to computer mouse or touchpad 324, and/or to display screen 320 for pressure sensing of alphanumeric character entry and user selections. The device drivers 312, R/W drive or interface 314 and network adapter or interface 316 may comprise hardware and software (stored on computer readable storage media 308 and/or ROM 306).

The programs described herein are identified based upon the application for which they are implemented in a specific one of the exemplary embodiments. However, it should be appreciated that any particular program nomenclature herein is used merely for convenience, and thus the exemplary embodiments should not be limited to use solely in any specific application identified and/or implied by such nomenclature.

It is to be understood that although this disclosure includes a detailed description on cloud computing, implementation of the teachings recited herein are not limited to a cloud computing environment. Rather, the exemplary embodiments of the present inventive concept are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider.

The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

FIG. 4 illustrates a cloud computing environment, in accordance with an exemplary embodiment of the present inventive concept.

As shown, cloud computing environment 50 may include one or more cloud computing nodes 40 with which local computing devices used by cloud consumers, such as, for example, personal digital assistant (PDA) or cellular telephone 54A, desktop computer 54B, laptop computer 54C, and/or automobile computer system 54N may communicate. Nodes 40 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 40 and cloud computing environment 50 can communicate with any type of computerized device over any type of network and/or network addressable connection (e.g., using a web browser).

FIG. 5 illustrates abstraction model layers, in accordance with an exemplary embodiment of the present inventive concept.

Referring now to FIG. 5, a set of functional abstraction layers provided by cloud computing environment 50 (FIG. 4) is shown. It should be understood in advance that the components, layers, and functions shown in FIG. 5 are intended to be illustrative only and the exemplary embodiments are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfilment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and protecting SPI in spoken commands 96.

The exemplary embodiments of the present inventive concept may be a system, a method, and/or a computer program product at any possible technical detail level of integration. The computer program product may include a computer readable storage medium (or media) having computer readable program instructions thereon for causing a processor to carry out aspects of the present inventive concept.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present inventive concept may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present inventive concept.

Aspects of the present inventive concept are described herein with reference to flowchart illustrations and/or block diagrams of methods, apparatus (systems), and computer program products according to exemplary embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present inventive concept. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Based on the foregoing, a computer system, method, and computer program product have been disclosed. However, numerous modifications, additions, and substitutions can be made without deviating from the scope of the exemplary embodiments of the present inventive concept. Therefore, the exemplary embodiments of the present inventive concept have been disclosed by way of example and not by limitation.

The invention claimed is:

1. A method for protecting sensitive personal information in spoken commands, the method performed by a server, the method comprising:
    masking superfluous portions of at least one classified command, wherein the masking comprises:
        tokenizing words of the at least one classified command and removing stop words;
        assigning a respective intent classification to the tokenized words; and
        masking the tokenized words of the at least one classified command having an assigned intent classification of non-essential, wherein a non-essential intent classification indicates that a tokenized word does not impact a desired meaning of the at least one classified command;
    identifying sensitive personal information (SPI) included in unmasked portions of the at least one classified command;

following a user privacy instruction before transmitting the unmasked portions that include the identified SPI to a third-party service;
generating an SPI protected version of the at least one classified command, wherein the generating comprises modifying the at least one classified command by filtering out the identified SPI included in the unmasked portions according to predetermined SPI rules of the user privacy instruction;
enabling a user to review and edit the SPI protected version of the at least one classified command; and
in response to receiving a confirmation of the SPI protected version of the at least one classified command from the user, transmitting the SPI protected version of the at least one classified command to the third-party service, wherein the SPI protected version of the at least one classified command is transmitted as a modified user audio recording.

2. The method of claim 1, further comprising:
obtaining a user speech corpus including at least one command;
classifying the at least one command in the user speech corpus;
wherein the classifying the at least one command in the user speech corpus includes filtering out intended conversation.

3. The method of claim 1, wherein the identifying the SPI included in the unmasked portions of the at least one classified command includes assigning an SPI detection tag to the tokenized words.

4. The method of claim 3, wherein the following the user privacy instruction is based on a user determination for each tokenized word with the SPI detection tag and/or
SPI restrictions according to characteristics of the third-party service.

5. The method of claim 1, wherein the third-party service is an external service that uses speech recognition.

6. A computer program product for protecting sensitive personal information in spoken commands, the computer program product being within a server, the computer program product comprising:
one or more non-transitory computer-readable storage media and program instructions stored on the one or more non-transitory computer-readable storage media capable of performing a method, the method comprising:
masking superfluous portions of at least one classified command, wherein the masking comprises:
tokenizing words of the at least one classified command and removing stop words;
assigning a respective intent classification to the tokenized words; and
masking the tokenized words of the at least one classified command having an assigned intent classification of non-essential, wherein a non-essential intent classification indicates that a tokenized word does not impact a desired meaning of the at least one classified command;
identifying sensitive personal information (SPI) included in unmasked portions of the at least one classified command;
following a user privacy instruction before transmitting the unmasked portions that include the identified SPI to a third-party service;
generating an SPI protected version of the at least one classified command, wherein the generating comprises modifying the at least one classified command by filtering out the identified SPI included in the unmasked portions according to predetermined SPI rules of the user privacy instruction;
enabling a user to review and edit the SPI protected version of the at least one classified command; and
in response to receiving a confirmation of the SPI protected version of the at least one classified command from the user, transmitting the SPI protected version of the at least one classified command to the third-party service, wherein the SPI protected version of the at least one classified command is transmitted as a modified user audio recording.

7. The computer program product of claim 6, wherein the method further comprises:
obtaining a user speech corpus including at least one command;
classifying the at least one command in the user speech corpus;
wherein the classifying the at least one command in the user speech corpus includes filtering out intended conversation.

8. The computer program product of claim 6, wherein the identifying the SPI included in the unmasked portions of the at least one classified command includes assigning an SPI detection tag to the tokenized words.

9. The computer program product of claim 8, wherein the following the user privacy instruction is based on a user determination for each tokenized word with the SPI detection tag and/or
SPI restrictions according to characteristics of the third-party service.

10. The computer program product of claim 6 wherein the third-party service is an external service that uses speech recognition.

11. A computer system for, protecting sensitive personal information in spoken commands, the system being within a server, the system comprising:
one or more computer processors, one or more computer-readable storage media, and program instructions stored on the one or more of the computer-readable storage media for execution by at least one of the one or more processors capable of performing a method, the method comprising:
masking superfluous portions of at least one classified command, wherein the masking comprises:
tokenizing words of the at least one classified command and removing stop words;
assigning a respective intent classification to the tokenized words; and
masking the tokenized words of the at least one classified command having an assigned intent classification of non-essential, wherein a non-essential intent classification indicates that a tokenized word does not impact a desired meaning of the at least one classified command;
identifying sensitive personal information (SPI) included in unmasked portions of the at least one classified command;
following a user privacy instruction before transmitting the unmasked portions that include the identified SPI to a third-party service;
generating an SPI protected version of the at least one classified command, wherein the generating comprises modifying the at least one classified command by filtering out the identified SPI included in the unmasked portions according to predetermined SPI rules of the user privacy instruction;

enabling a user to review and edit the SPI protected version of the at least one classified command; and in response to receiving a confirmation of the SPI protected version of the at least one classified command from the user, transmitting the SPI protected version of the at least one classified command to the third-party service, wherein the SPI protected version of the at least one classified command is transmitted as a modified user audio recording.

12. The computer system of claim 11, wherein the method further comprises:

obtaining a user speech corpus including at least one command;

classifying the at least one command in the user speech corpus;

wherein the classifying the at least one command in the user speech corpus includes filtering out unintended conversation.

13. The computer system of claim 11, wherein the identifying the SPI included in the unmasked portions of the at least one classified command includes assigning an SPI detection tag to the tokenized words.

14. The computer system of claim 13, wherein the following the user privacy instruction is based on a user determination for each tokenized word with the SPI detection tag and/or SPI restrictions according to characteristics of the third-party service.

15. The computer system of claim 11, wherein the third-party service is an external service that uses speech recognition.

* * * * *